US010556690B2

(12) United States Patent
McGreevy et al.

(10) Patent No.: US 10,556,690 B2
(45) Date of Patent: Feb. 11, 2020

(54) ARMREST ASSEMBLY FOR AIRCRAFT SEATING

(71) Applicant: Thompson Aero Seating Limited, Portadown, Craigavon (GB)

(72) Inventors: Jonathan McGreevy, Craigavon (GB); Aaron Robinson, Craigavon (GB)

(73) Assignee: Thompson Aero Seating Limited, Craigavon (GB)

( * ) Notice: Subject to any disclaimer, the term of this patent is extended or adjusted under 35 U.S.C. 154(b) by 294 days.

(21) Appl. No.: 15/070,039

(22) Filed: Mar. 15, 2016

(65) Prior Publication Data

US 2016/0272328 A1 Sep. 22, 2016

(30) Foreign Application Priority Data

Mar. 16, 2015 (GB) .................................. 1504364.9

(51) Int. Cl.
*B60N 2/06* (2006.01)
*B64D 11/06* (2006.01)
(Continued)

(52) U.S. Cl.
CPC .......... *B64D 11/0644* (2014.12); *B60N 2/753* (2018.02); *B60N 2/77* (2018.02);
(Continued)

(58) Field of Classification Search
CPC .... B64D 11/0644; B64D 11/06; B60N 2/753; B60N 2/77; B60N 2/464; A47C 1/03; A61G 2005/125
(Continued)

(56) References Cited

U.S. PATENT DOCUMENTS 5,795,025 A * 8/1998 Murphy .................. B60N 2/77
297/411.36
6,976,739 B2 * 12/2005 Wang ....................... A47C 1/03
297/411.2
(Continued)

FOREIGN PATENT DOCUMENTS

DE  102008050953 A1  4/2010
FR    2725762 A1     4/1996
(Continued)

OTHER PUBLICATIONS

Search Report under Section 17 for Application No. GB1504364.9 dated Sep. 15, 2015.
European Search Report for EP16160316 dated Jul. 7, 2016.

*Primary Examiner* — Syed A Islam
(74) *Attorney, Agent, or Firm* — Burns & Levinson LLP; John C. Serio; Marlo Schepper Grolnic (57) ABSTRACT

An armrest assembly comprising a base structure and an upper structure that has an upper surface providing an armrest. The upper structure is movable with respect to the base structure between an upper position and a lower position under the control of a lockable actuator that is operable to lock the upper structure with respect to the base structure in any one of a plurality of adoptable positions. A second locking device is operable to lock the upper structure with respect to the base structure in at least one of the adoptable positions, the locking device including locking elements that inter-engage mechanically when the second locking device locks the upper structure with respect to said base structure.

20 Claims, 8 Drawing Sheets

(51) Int. Cl.
*B60N 2/75* (2018.01)
*A47C 1/03* (2006.01)

(52) U.S. Cl.
CPC ............... B64D 11/06 (2013.01); *A47C 1/03* (2013.01); *B64D 11/0646* (2014.12)

(58) Field of Classification Search
USPC ....... 297/411.3, 411.32, 411.35, 411.36, 145
See application file for complete search history.

(56) References Cited

U.S. PATENT DOCUMENTS

| | | | | |
|---|---|---|---|---|
| 7,156,466 | B1 * | 1/2007 | Chang | A47C 1/03 |
| | | | | 297/115 |
| 7,387,342 | B1 * | 6/2008 | Clough | B60N 2/77 |
| | | | | 297/411.36 |
| 8,128,171 | B2 * | 3/2012 | Tsai | A47C 1/03 |
| | | | | 297/411.36 |
| 8,251,453 | B2 * | 8/2012 | Chen | A47C 1/03 |
| | | | | 297/411.36 |
| 2009/0243352 | A1 | 10/2009 | Cailleteau | |
| 2013/0119738 | A1 * | 5/2013 | Wallis | A47C 7/54 |
| | | | | 297/411.36 |
| 2014/0300147 | A1 | 10/2014 | Suhre et al. | |
| 2015/0274302 | A1 * | 10/2015 | Suhre | B64D 11/06 |
| | | | | 297/170 |

FOREIGN PATENT DOCUMENTS

FR         2882306  A1    8/2006
FR         2963587  A1    2/2012

\* cited by examiner

ARMREST ASSEMBLY FOR AIRCRAFT SEATING

CROSS-REFERENCE TO RELATED APPLICATIONS

This application claims priority to Great Britain Patent Application No. 1504364.9, filed on Mar. 16, 2015, entitled Armrest Assembly for Aircraft Seating, the contents of which are incorporated herein by reference in their entirety for all purposes.

FIELD OF THE INVENTION

The present invention relates to armrests, and especially to armrest assemblies for aircraft seating.

BACKGROUND TO THE INVENTION

Premium aircraft seating is expected to exhibit a quality feel as well as functionality. However, mechanisms that provide a quality feel do not necessarily lend themselves to all aspects of desired quality and vice versa.

It would be desirable to provide a premium armrest for aircraft seating having improved functionality.

SUMMARY OF THE INVENTION

Accordingly, the present invention provides an armrest assembly comprising: a base structure; an upper structure that has an upper surface providing an armrest, the upper structure being movable with respect to the base structure between an upper position and a lower position; an actuator for controlling movement of said upper structure relative to said base structure; and a locking device operable to lock said upper structure with respect to said base structure in at least one of said adoptable positions, said locking device including locking elements that inter-engage mechanically when said locking device locks said upper structure with respect to said base structure.

Preferably, the first locking device includes biasing means for biasing said upper structure towards one or other of said upper or lower positions.

Ideally, said biasing means comprising resilient biasing means, for example one or more springs.

Preferably, said biasing means are configured to urge said upper structure towards said upper position.

Ideally, said biasing means is configured to urge said actuator into an extended state, said actuator being operable towards a retracted state against said bias.

Preferably, actuator is operable between an extended state and a retracted state, and is lockable to prevent extension or retraction.

Ideally, said actuator comprises a linear actuator.

Preferably, said actuator comprises a fluid-operated actuator.

In the preferred embodiment said actuator is a hydraulically operated actuator, preferably a hydraulically lockable actuator.

Ideally, said second locking device is operable to lock said upper structure with respect to said base structure in any one of a plurality of, preferably all of, said adoptable positions.

Preferably, said second locking device comprises a mortise and tenon locking device.

Ideally, said locking elements comprise a tenon that is releasably engageable with at least one mortise.

Preferably, said tenon is releasably engageable with any one of a plurality of mortises.

In the preferred embodiment, a respective mortise is provided for each of said adoptable positions.

Ideally, said upper structure is movable substantially linearly with respect to said base structure between said upper and lower positions.

Preferably, said upper structure is movable with respect to said base structure between said upper and lower positions in a direction that is substantially perpendicular with said upper surface.

Ideally, the actuator is oriented for operation towards its retracted state by movement of said upper structure in a direction away from its upper position.

Preferably, said first locking device is operable between a locked state in which said actuator is locked to prevent movement of said upper structure with respect to said base structure, and an unlocked state in which said actuator is unlocked to facilitate movement of said upper structure with respect to said base structure.

Ideally, said second locking device is operable between a locked state in which said locking elements inter-engage to prevent movement of said upper structure with respect to said base structure, and an unlocked state in which said locking elements allow movement of said upper structure with respect to said base structure.

Preferably, an operating mechanism being coupled to said first locking device and being operable by a user to operate said first locking device between its locked and unlocked states.

Ideally, the operating mechanism coupled to said second locking device and being operable by a user to operate said second locking device between its locked and unlocked states.

In a preferred embodiment, the operating mechanism coupled to said first locking device and to said second operating device and being operable by a user to operate, preferably simultaneously, said first and second locking devices between their respective locked and unlocked states.

In a preferred embodiment the actuator is fluid operated and includes a locking valve operable to effect locking and unlocking of said actuator, the operating mechanism being coupled to said locking valve for the operation thereof.

In a preferred embodiment the locking elements of said second locking device including a movable tenon, said operating mechanism being coupled to said tenon for movement of said tenon into and out of locking engagement with a mortise.

Ideally, the operating mechanism comprising a user operable control, for example a button or switch, and a respective linkage, preferably a mechanical linkage, for example one or more cables, for coupling with said first and/or second locking devices.

Preferably, the actuator is coupled to said base structure by a linkage that allows pivoting movement of said actuator with respect to said base and upper structures.

Ideally, the upper structure is a panel structure.

Preferably, at least part of said first locking mechanism and/or said second locking mechanism is located inside said upper panel structure.

Ideally, the base structure is a panel structure.

Preferably at least part of said first locking mechanism and/or said second locking mechanism is located inside said base panel structure.

Ideally, the base structure and the upper structure are assembled together telescopically.

In a preferred embodiment the upper structure is the outer telescopic component of the telescopic assembly.

Typically one or more armrest assemblies embodying the invention are incorporated into a seating installation, especially an aircraft seating installation, the seating installation comprising at least one seat.

BRIEF DESCRIPTION OF THE DRAWINGS

Embodiments of the invention are now described by way of example and with reference to the accompanying drawings in which like numerals are used to denote like parts and in which.

DETAILED DESCRIPTION OF THE DRAWINGS

FIGS. 1 to 7 show a preferred embodiment of the armrest assembly, which is generally indicated by the reference numeral 1. The armrest assembly 1 comprises a base structure 2, typically comprising a frame 5. In the illustrated embodiment the frame 5 comprises first and second spaced apart upright supports 6, 8. Typically, supports 6, 8 each comprise a respective elongate post. The respective lower end of supports 6, 8 may be mounted on any suitable base (not shown), which may, for example, be part of the armrest assembly 1 (e.g. a base component of the frame 5), or part of a seating installation of which the armrest assembly may be part, or a floor on which the seating installation is installed, or a mounting fixture provided on the floor).

Figure 1:
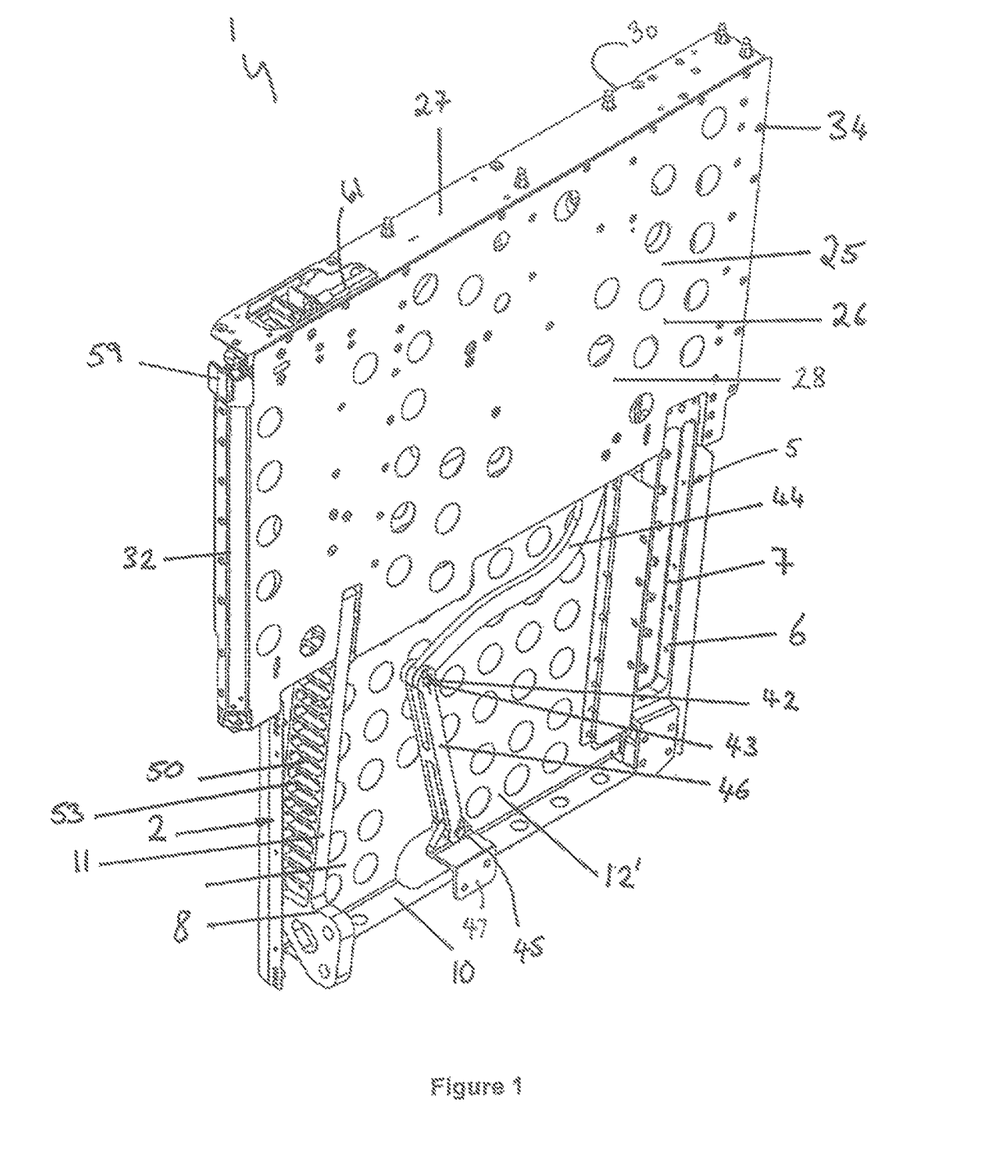
FIG. 1 shows a perspective view of an armrest assembly embodying the invention.
Figure 2:
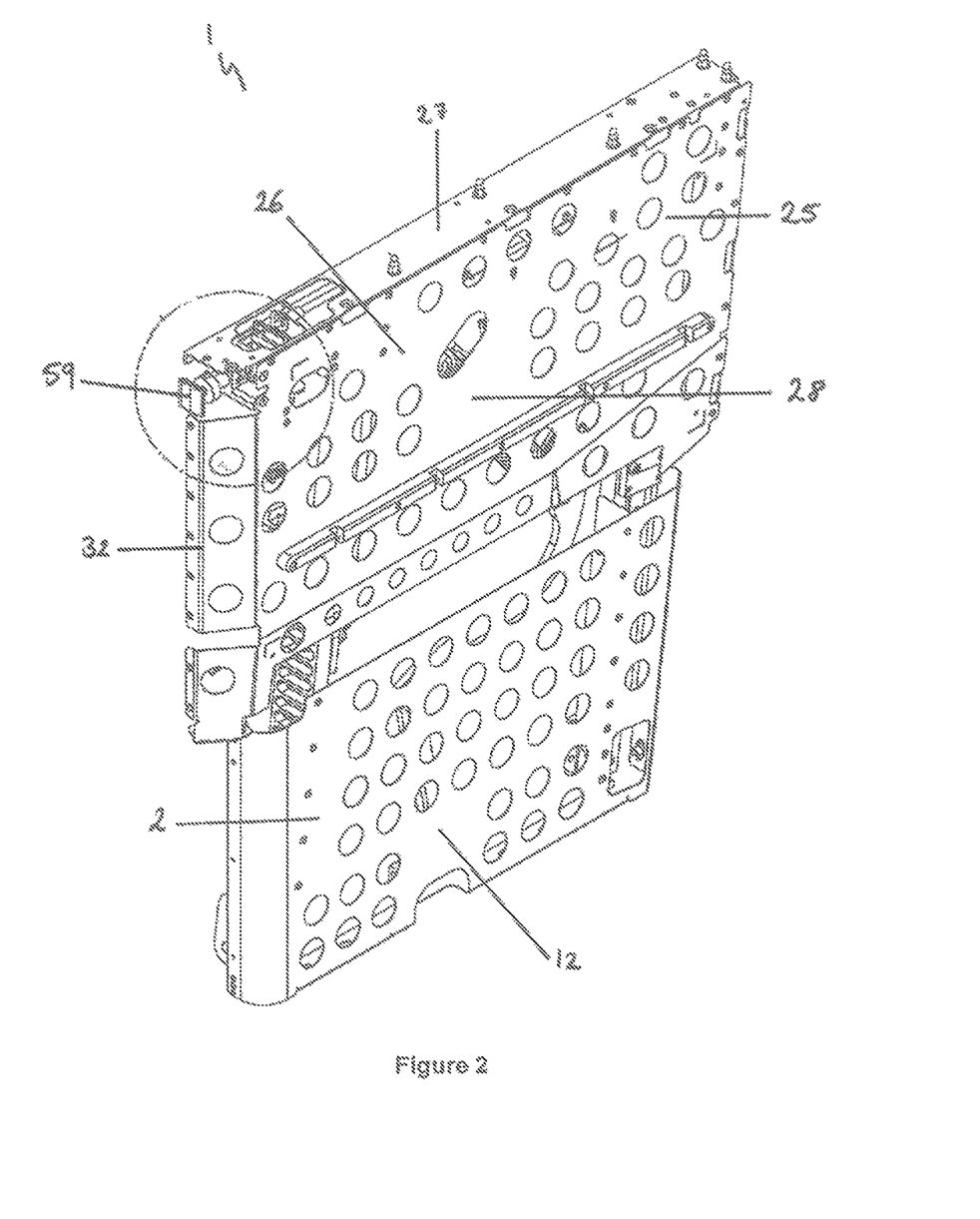
FIG. 2 shows an alternative perspective view of armrest assembly of FIG. 1.
Figure 3:
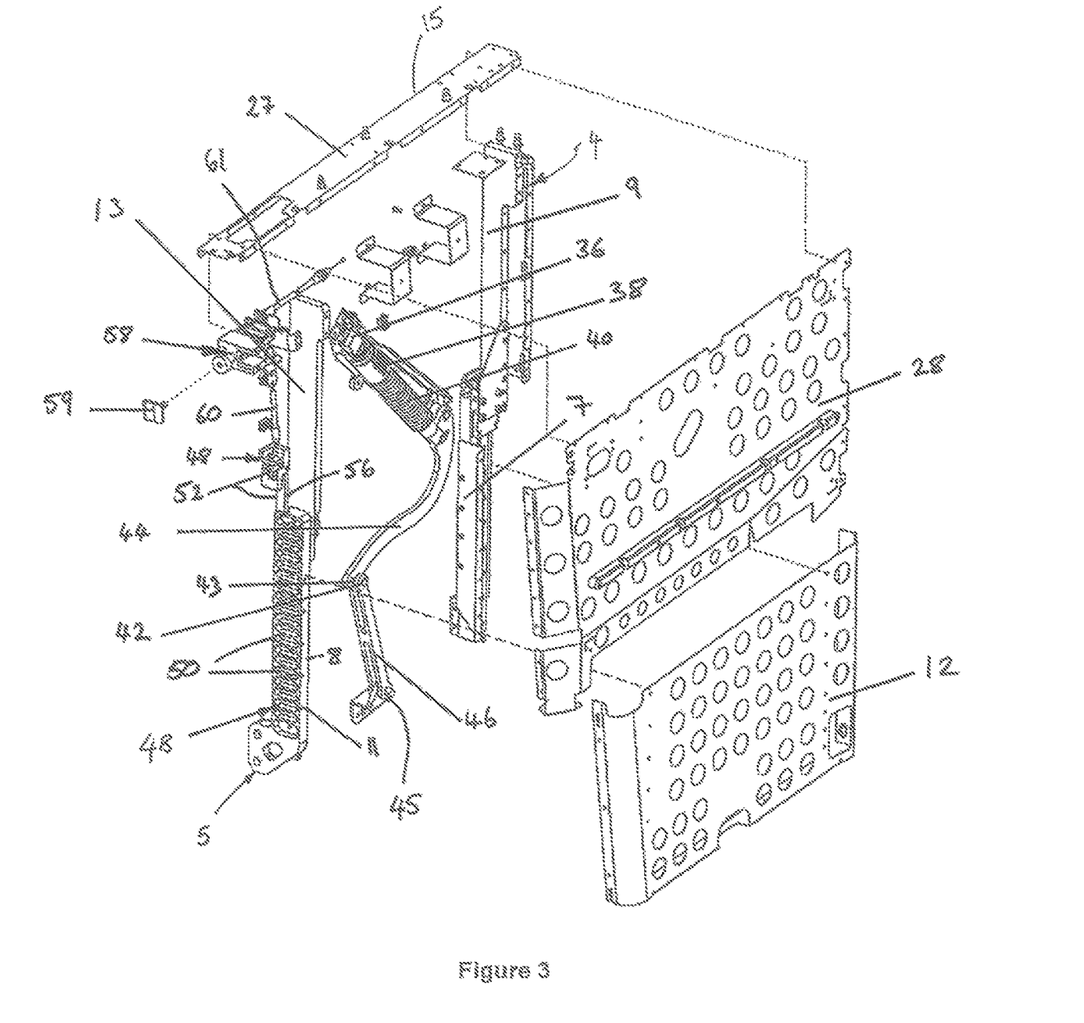
FIG. 3 shows an exploded view of the armrest assembly.
Figure 4:
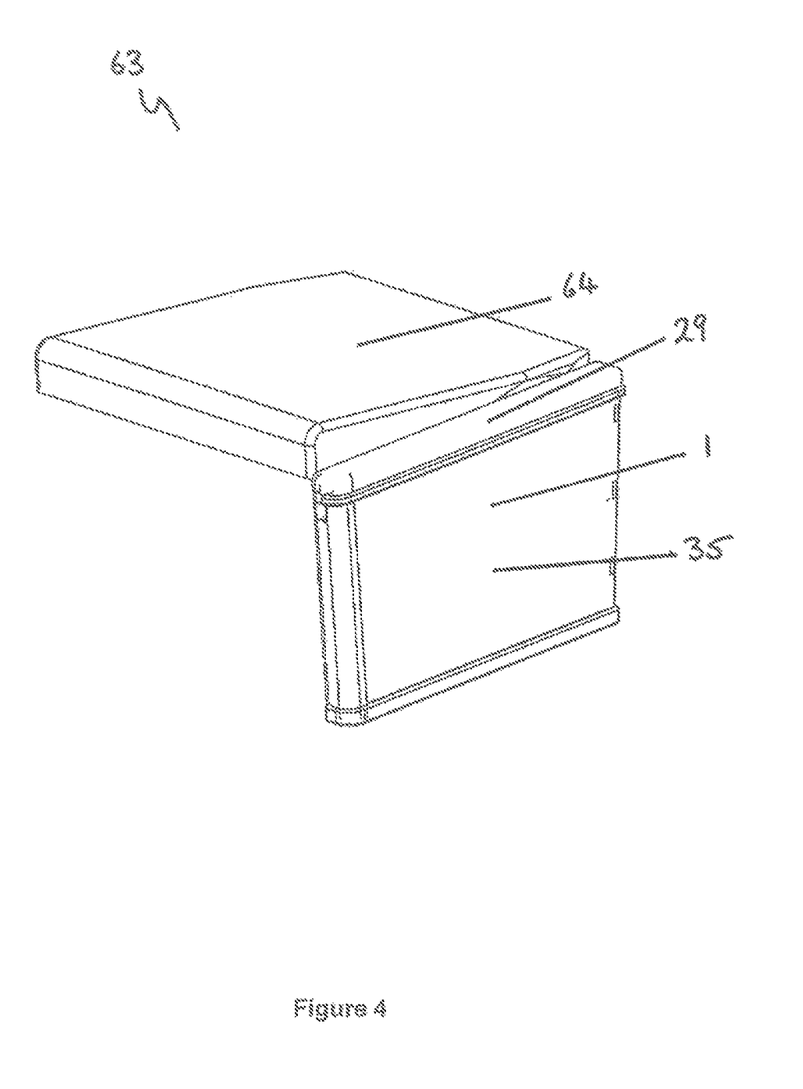
FIG. 4 shows a front perspective view of part of a seating installation incorporating the armrest assembly of FIG. 1, the armrest assembly being shown in its lower position.
Figure 5:
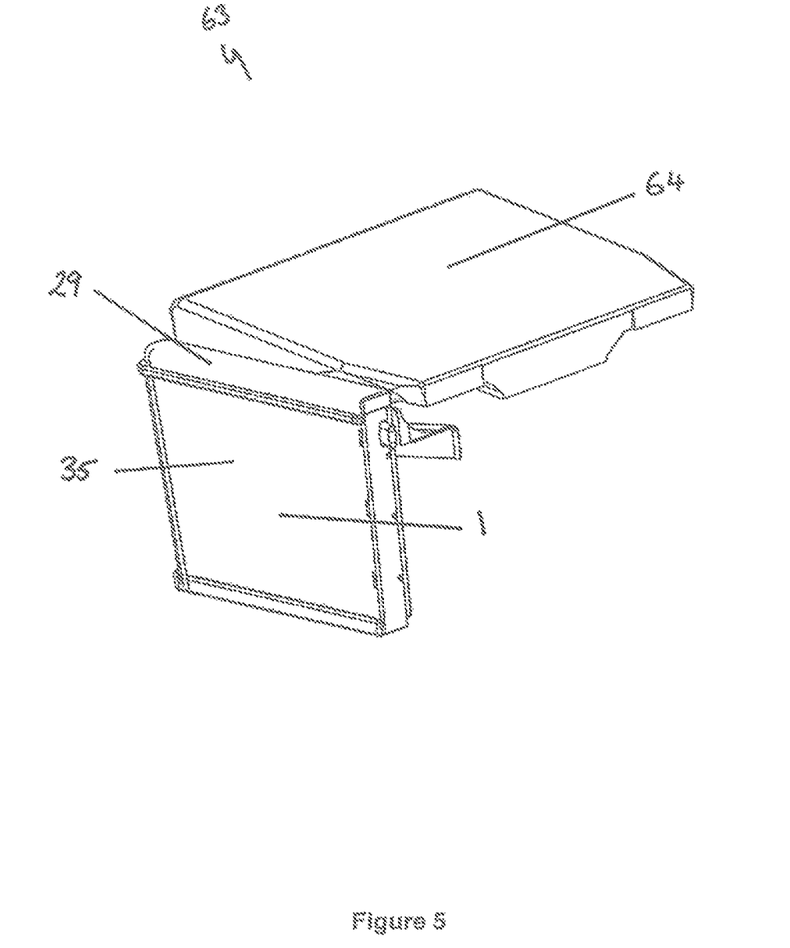
FIG. 5 shows a rear perspective view of the partial seating installation having the armrest assembly in its lower position.
Figure 6:
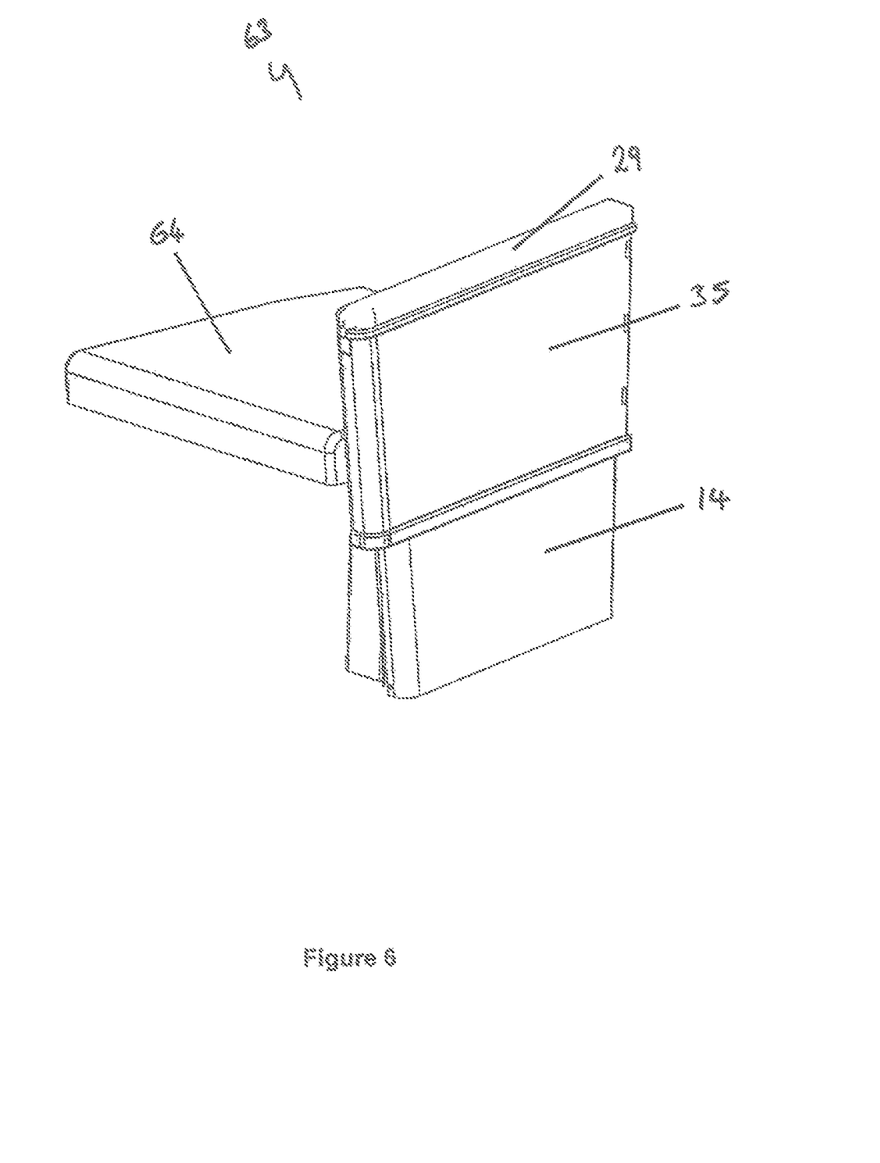
FIG. 6 shows a front perspective view of the partial seating installation having the armrest assembly in its upper position.
Figure 7:
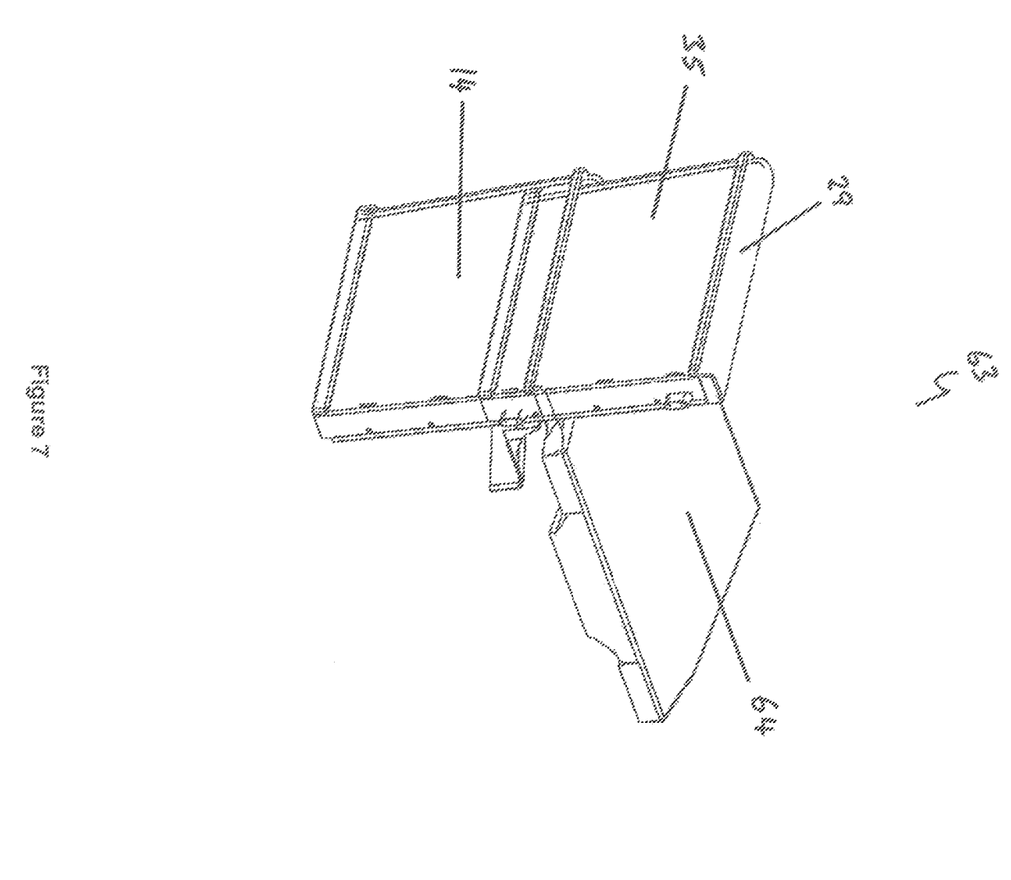
FIG. 7 shows a rear perspective view of the partial seating arrangement having the armrest assembly in its upper position.

In preferred embodiments the base structure 2 comprises a panel structure, for example having one or more panels 12, 12' carried by the frame 5. In the illustrated embodiment, first and second panels 12, 12' are provided, a respective one for each opposing side of the base structure 2. The panels 12, 12' may be mounted on the supports 6, 8 by any convenient means, e.g. screws, bolts or rivets. Advantageously, the panels 12, 12' provide the base structure 2 with a substantially planar surface at its sides (or at one side in cases where a panel is provided at one side only). The support panels 12, 12' are typically substantially rectangular shape. As a result, the base structure 2 may be generally rectangular in shape.

The base structure 2, and its component parts, may be made from any suitable material, for example plastics, composites, metal or any combination thereof. Typically, the frame 5 and panels 12, 12' are made predominantly from metal, e.g. steel or aluminium. As may be seen from FIGS. 4 to 7, the base structure 2 may have cladding 14 provided on one or both of its sides, conveniently carried by one or both of the panels 12, 12'. The cladding may take any convenient form, e.g. upholstery, shell or other trim component, and may be fixed to the base structure 2 by any conventional means.

The armrest assembly 1 further comprises an upper structure 25, typically comprising a frame 4. In the illustrated embodiment the frame 4 comprises first and second spaced apart upright supports 9, 13. Typically, supports 9, 13 each comprise a respective elongate post. Typically the frame 4 includes an upper support 15 extending between the respective upper ends of upright supports 9, 13.

In preferred embodiments the upper structure 25 comprises a panel structure, for example having one or more panels 28 (only one shown) carried by the frame 4. In the illustrated embodiment, first and second panels 28 are provided (only one visible), a respective one for each opposing side of the upper structure 25. The panels 28 may be mounted on the supports 9, 13 by any convenient means, e.g. screws, bolts or rivets. Advantageously, the panels 28 provide the upper structure 25 with a substantially planar surface at its sides (or at one side in cases where a panel is provided at one side only). The panels 28 are typically substantially rectangular shape. As a result, the upper structure 25 may be generally rectangular, or more particularly generally cuboid, in shape.

The upper structure 25, and its component parts, may be made from any suitable material, for example plastics, composites, metal or any combination thereof. Typically, the frame 4 and panels 28 are made predominantly from metal, e.g. steel or aluminium. As may be seen from FIGS. 6 and 7, the upper structure 25 may have cladding 35 provided on one or both of its sides, conveniently carried by one or both of the panels 28. Cladding 29 may also be provided on an upper surface 27 of the structure 25 to serve as an armrest for a user. The cladding may take any convenient form, e.g. upholstery, shell or other trim component, and may be fixed to the upper structure 25 by any conventional means.

In the illustrated embodiment, the upper structure 25 takes the form of a substantially open bottom box, having an upper surface 27 with surrounding side walls 28, 30, 32, 34. The side walls may have substantially planar surfaces of rectangular shape. Typically the upper structure 25 is substantially rectangular, or more particularly, cuboidal in shape. The side walls 28, 30, 32, 34 are conveniently provided by the panels 28. Typically side walls 28, 30 are longer than side walls 32, 34.

The base structure 2 and the upper structure 25 are assembled together such that the upper structure 25 is movable with respect to the base structure 2 between an upper (or raised) position and a lower (or lowered) position. For example, the base structure 2 and the upper structure 25 may be assembled together telescopically, typically with the upper structure 25 being shaped and dimensioned to form the outer telescopic component of the telescopic assembly. To this end, the upper structure 25 is open along its lower end to receive the base structure 2. Preferably, the upper structure 25 is movable substantially linearly with respect to the base structure 2 between the upper position (FIGS. 4, 5) and the lower position (FIGS. 6, 7), usually in a direction that is substantially perpendicular with the upper surface 27. When installed, e.g. in an aircraft, the base structure 2 is fixed with respect to the floor or other base on which it is mounted.

Typically, the respective frames 4, 5 are coupled together to allow relative movement, in this case substantially linear movement, between the upper and base structures. Any conventional coupling may be used for this purpose, e.g. one or more slide mechanisms. For example, one or both of the supports 6, 8 of the base structure 2 may be slidably coupled to a respective one of the supports 9, 13 of the upper structure 25, or otherwise coupled for linear movement.

The armrest assembly 1 comprises a first locking device 36. The first locking device 36 is operable to lock said upper structure 25 with respect to the base structure 2 in any one of a plurality of adoptable positions. At least part of, or all of, the first locking device is conveniently located inside the upper structure 25 and/or the base structure 2. In the preferred embodiment the first locking device 36 is coupled between the base structure 2 and the upper structure 25. The preferred first locking device 36 comprises a lockable actuator 38 which controls, and can effect, movement of the upper structure 25 relative to the base structure 2 in-use. The first locking device 36 further comprises biasing means 40 for biasing the upper structure 25 to towards one or other (typically the upper) of said upper or lower positions in-use. The biasing means 40 preferably provides resilient biasing and may, for example, comprise one or more springs or other resilient biasing devices, conveniently incorporated into the actuator 38, e.g. a return spring. Typically, the biasing means 40 is configured to urge said upper structure 25 towards said upper position in-use. To this end, in the illustrated embodiment, the biasing means is configured to urge the actuator 38 into an extended state, the actuator 38 being operable towards a retracted state against the resilient bias. Since the actuator 38 can, through the action of the biasing means 40, effect movement of the upper structure 25, it is referred to as an actuator. It may alternatively be referred to as a damper in that it controls the movement of the upper structure 25.

The actuator 38 is operable between an extended state and a retracted state and can be locked to prevent extension or retraction in-use. Correspondingly, the first locking device 36 is operable between a locked state in which the actuator 38 is locked to prevent movement of the upper structure 25 with respect to the base structure 2 and an unlocked state in which the actuator 38 is unlocked to facilitate, e.g. allow or cause, movement of the upper structure 25 with respect to the base structure 2. Typically, the actuator 38 is orientated for operation towards its retracted state by movement of the upper structure 25 in a direction away from its upper position, although the opposite orientation could alternatively be adopted. In preferred embodiments, the actuator 38 comprises a linear actuator, e.g. a gas or hydraulic strut. The actuator 38 is typically a fluid-operated actuator, e.g. a hydraulic or gas actuator, and may be hydraulically or otherwise lockable. The actuation is typically provided by the actuator's resilient biasing, but it alternative embodiments power-operated actuators may be used, e.g. single or double acting hydraulic, pneumatic or electric actuators.

In preferred embodiments, actuator 38 is a linear, preferably hydraulic, locking device comprising a piston within a piston housing and an extendible piston rod connected to the piston and resiliently biased towards its extended state (in this case by the return spring 40). The piston has an integral valve and porting system to allow controlled transfer of hydraulic fluid from one side of the piston to the other within the housing. A control mechanism (e.g. a rod or lever) is operable to open the integral valve and allow the fluid transfer. When the valve is open and a compressive load is applied to the piston rod (e.g. by a user pushing down on the armrest), the resilient bias is overcome and the piston rod retracts. When the valve is open and no compressive load, or a compressive load insufficient to overcome the resilient bias, is applied to the piston rod, the piston rod extends under the influence of the resilient bias (unless is it already fully extended). When the valve is closed by the control mechanism, the closed valve prevents fluid transfer and so prevents movement of the piston rod, i.e. locks the actuator 38 in its state of relative extension/retraction. Conveniently, the control mechanism is operable by operating mechanism 58 as described in more detail hereinafter.

The actuator 38 is coupled between the base structure 2, or to any other suitable base, e.g. the floor or mounting structure and the upper structure 25. In the illustrated embodiment the actuator 38 is coupled to the base structure 2 (or to any other suitable base, e.g. the floor or mounting structure) by a linkage 42. As illustrated, the base of the actuator 38 may be connected to the linkage 42 and the extendible end of the actuator 38 may be coupled to the upper structure 25. The preferred linkage 42 is configured to allow, in conjunction with the actuator 38, substantially linear movement of the upper structure 25 relative to the base structure 2 in-use. To this end, the linkage 42 allows pivoting movement of the actuator 38 with respect to the base and upper structure 2, 25 in-use. The preferred linkage 42 has first and second portions 44, 46. The first portion 44 is coupled to the actuator 38 at one end and pivotably coupled to the second portion 46 at the other end by a respective hinge 43. In the preferred embodiment the first portion 44 comprises an arcuate member. The second portion 46 is pivotably coupled to the first portion 44 at one end and pivotably coupled to the base 2 at its other end by a respective hinge 45. For example the second portion 46 can be coupled to a support structure such as a floor or rail (not shown), e.g. via a bracket 47. In the preferred embodiment the second portion 46 comprises an elongate member.

The armrest assembly 1 further comprises a second locking device 48. The second locking device 48 is operable to lock the upper structure 25 with respect to the base structure 2 in any one of a plurality of, preferably all of, the adoptable positions. The second locking device 48 is operable between a locked state, in which locking elements inter-engage mechanically to prevent movement of the upper structure 25 with respect to the base structure 2, and an unlocked state in which the locking elements allow movement of the upper structure 25 with respect to the base structure 2, typically by dis-engaging form one another. At least part of the second locking device 48 is conveniently located inside the upper structure 25 and/or base structure 2.

In preferred embodiments, the second locking device 48 comprises a mortise and tenon locking device, although other mechanically inter-engagable locking devices could alternatively be used. In the illustrated embodiment, the second locking device 48 comprises a first locking element in the form of a tenon 52, which is releasably engageable with at least one other locking element in the form of one or more mortise 50. In the preferred embodiment the tenon 52 is releasably engageable with any one of a plurality of mortises 50, each being positioned to correspond to a respective one of the upper structure's adoptable positions. Accordingly, the mortises 50 are spaced apart in a direction that is parallel to the direction of movement of the upper structure 25.

In the illustrated embodiment the tenon 52 is provided on the upper structure 25 and the mortises 50 are provided on the base structure 2, although the opposite arrangement may be adopted in alternative embodiments.

The mortises 50 may be provided on the frame 5. Conveniently, the mortises 50 are provided on any one or both of the upright supports 6, 8, e.g. support post 8 in the illustrated embodiment. Each mortise 50 may take the form of an aperture or socket, for example formed in the support post 8 as illustrated.

The tenon 52, which may for example comprise a latch 56, is movable, typically pivotably, into and out of engagement with any one of the mortises 50 with which it is aligned depending on the relative position of the upper and base structures 2, 25. In this example, the tenon 52 is pivotably coupled to the upper structure 25, e.g. to the frame 4.

In preferred embodiments, the first and second locking devices 36, 48 are coupled to a common operating mechanism 58. The operating mechanism 58 is operable by a user to operate the first and or second locking device 36, 48 between their locked and unlocked states. In the preferred embodiment the operating mechanism 58 operates the first and second locking device 36, 48 simultaneously. The operating mechanism 58 comprises a user operable control 59, for example a button or switch, and a respective linkage 60, 61, preferably a mechanical linkage, for example one or more cables, coupled to said first and/or second locking devices 36, 48 for the operation thereof. Alternatively the linkage may comprise an electrical linkage, for example wired or wireless link, for controlling one or more motors to activate the first and second locking devices 36, 48. Typically, at least part of or all of the operating mechanism 58 is located in the upper structure 25.

In the illustrated embodiment, the actuator 38 is fluid operated and includes a locking valve operable to effect locking and unlocking of the actuator 38 in-use. The locking valve (or more particularly a control mechanism for the locking valve) is coupled to the operating mechanism 58, in particular to cable 61, and is operable thereby to lock and unlock the actuator 38. The operating mechanism 58 is coupled to the moveable tenon 52 by cable 60 and causes movement of the tenon 52 into out and out of locking engagement with the relevant mortise 50.

Typical use of the preferred embodiment is now described. When the upper structure 25 is in a desired position with respect to the base structure 2, the operating mechanism 58 is operated such that the first and second locking devices 36, 48 adopt their locked states. Preferably, this is effected by releasing the user control 59. When it is desired to move the upper structure 25 to a different position, i.e. up or down with respect to the base structure 2, the user operates the operating mechanism 58 to unlock each of the first and second locking devices 36, 48, e.g. by pressing the control 59 in this example. With the locking devices unlocked, the upper structure 25 can be moved up or down. Downward movement is typically effected by the user pushing downwards on the upper structure 25 e.g. via the armrest 29, and the movement is controlled (e.g. damped) by the action of the actuator 38 (as it retracts in this case), advantageously providing a quality feel to the user. Upward movement is caused or at least assisted by the action of the actuator 38 (as it extends in this case), advantageously providing a quality feel to the user. In this example it is the biasing means 40 that causes the actuator 38 to extend. When the upper structure 25 has reached the desired new position, the operating mechanism 58 is operated to cause each of the first and second locking devices 36, 48 to adopt their locking states. The tenon 52 engages with whichever mortise 50 it is aligned with when the upper structure 25 is in the new position. Hence the number and positions of the mortises 50 determine the number and positions of the upper structure's adoptable positions.

Advantageously, the mechanical locking action of the second locking device 48 enables the armrest assembly 1 to be load-bearing in any position of the upper structure 25. As such it is safe to stand on the armrest during cleaning, maintenance or installation, or in the event of an emergency.

Typically, the armrest assembly 1 is a component of a seating installation (only part of one seat shown) generally indicated by the reference numeral 63. In the preferred embodiment the seating installation 63 is an aircraft seating installation having at least one seat 64.

Figure 8:
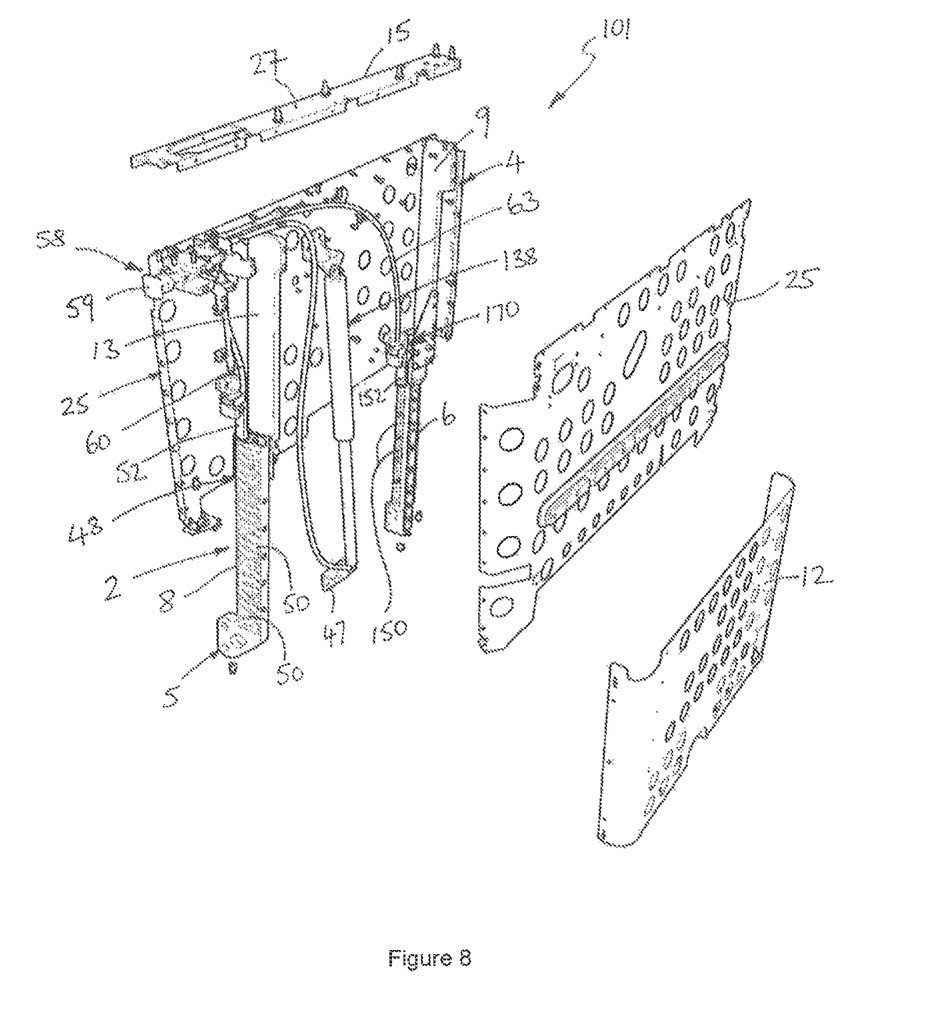
FIG. 8 shows an exploded view of an alternative embodiment of the armrest assembly.

Referring now to FIG. 8 of the drawings there is shown, generally indicated as 101, an alternative embodiment of the armrest assembly. The assembly 101 is similar to the assembly 1 of FIGS. 1 to 7, like numerals being used to denote like parts and the same or similar description applying, unless otherwise indicated, as would be apparent to a skilled person.

The assembly 101 includes an actuator 138, which may or may not be a locking actuator and so may or may not serve as the first locking device. The actuator 138 controls, and can effect, movement of the upper structure 25 relative to the base structure 2 in-use. The actuator 138 further comprises biasing means (not shown) for biasing the upper structure 25 to towards one or other (typically the upper) of said upper or lower positions in-use. The biasing means preferably provides resilient biasing and may, for example, comprise one or more springs or other resilient biasing devices, conveniently incorporated into the actuator 38, e.g. a return spring. Typically, the biasing means is configured to urge said upper structure 25 towards said upper position in-use. To this end, in the illustrated embodiment, the biasing means is configured to urge the actuator 138 into an extended state, the actuator 138 being operable towards a retracted state against the resilient bias. Since the actuator 138 can, under the action of the biasing means, effect movement of the upper structure 25, it is referred to as an actuator. It may alternatively be referred to as a damper in that it controls the movement of the upper structure 25.

The actuator 138 may be lockable in which case the same description applies as provided in relation to the actuator 38. In cases where the actuator 138 is not lockable, it is nonetheless operable between an extended state and a retracted state and controls, e.g. allows or causes, movement of the upper structure 25 with respect to the base structure 2. Typically, the actuator 138 is orientated for operation towards its retracted state by movement of the upper structure 25 in a direction away from its upper position. In preferred embodiments, the actuator 138 comprises a linear actuator, e.g. a hydraulic or gas strut. The actuator 138 is typically a fluid-operated actuator, e.g. a hydraulic or gas actuator, and may be hydraulically or otherwise lockable. The actuation is typically provided by the actuator's resilient biasing, but it alternative embodiments power-operated actuators may be used, e.g. single or double acting hydraulic, pneumatic or electric actuators.

The actuator 138 is coupled between the base structure 2, or to any other suitable base, e.g. the floor or mounting structure (via bracket 47 in the illustrated example), and the upper structure 25. In the illustrated embodiment the base of actuator 138 is coupled (e.g. directly connected) to the upper structure 25 and the extendible end of the actuator 38 is coupled (e.g. directly connected) to the base structure 2, or to any other suitable base, e.g. the floor or mounting structure (although the opposite arrangement could be adopted, i.e. the orientation of the actuator 138 shown in FIG. 8 could be inverted). In this embodiment there is no need for a linkage, the arrangement being such that the size and orientation of the actuator 138 allows substantially linear movement of the upper structure 25 relative to the base structure 2 in-use. To this end, any one or both of the couplings between the actuator 138 and upper structure/base may be pivotable.

In preferred embodiments, actuator 138 is a linear, preferably hydraulic, actuator comprising a piston within a piston housing and an extendible piston rod connected to the piston and resiliently biased towards its extended state, e.g. by a return spring (not shown), which may be internal or external. When a compressive load is applied to the piston rod (e.g. by a user pushing down on the armrest), the resilient bias is overcome and the piston rod retracts. When no compressive load, or a compressive load insufficient to overcome the resilient bias, is applied to the piston rod, the piston rod extends under the influence of the resilient bias (unless is it already fully extended).

In addition to the second locking device 48, the armrest assembly 101 comprises a further locking device 170. The locking device 170 is spaced apart from the second locking device 48 in a direction perpendicular to the direction of movement of the upper structure 25, advantageously such that a respective one of the locking devices 48, 170 is located on either side of the in-use central vertical axis (not illustrated) of the armrest assembly 101. Conveniently, a respective one of the locking devices 48, 170 is located at each end of the armrest assembly 101 (typically corresponding to the front and rear of the armrest assembly 101). Conveniently, the actuator 138 is located between the locking devices 48, 170.

The locking device 170 may be the same or similar to the locking device 48 and so the same or similar descriptions apply as would be apparent to a skilled person. The locking device 170 is operable to lock the upper structure 25 with respect to the base structure 2 in any one of a plurality of, preferably all of, the adoptable positions. The locking device 170 is operable between a locked state, in which locking elements inter-engage mechanically to prevent movement of the upper structure 25 with respect to the base structure 2, and an unlocked state in which the locking elements allow movement of the upper structure 25 with respect to the base structure 2, typically by dis-engaging form one another. At least part of the locking device 170 is conveniently located inside the upper structure 25 and/or base structure 2.

In preferred embodiments, the locking device 170 comprises a mortise and tenon locking device, although other mechanically inter-engagable locking devices could alternatively be used. In the illustrated embodiment, the locking device 170 comprises a first locking element in the form of a tenon 152, which is releasably engageable with at least one other locking element in the form of one or more mortise 150. In the preferred embodiment the tenon 152 is releasably engageable with any one of a plurality of mortises 150, each being positioned to correspond to a respective one of the upper structure's adoptable positions. Accordingly, the mortises 150 are spaced apart in a direction that is parallel to the direction of movement of the upper structure 25.

In the illustrated embodiment the tenon 152 is provided on the upper structure 25 and the mortises 150 are provided on the base structure 2, although the opposite arrangement may be adopted in alternative embodiments.

The mortises 150 may be provided on the frame 5. Conveniently, the mortises 150 are provided on any one of the upright supports 6, 8, e.g. support post 6 in the illustrated embodiment (the other of the support posts conveniently including the mortises 50 for the second locking device 48). Each mortise 150 may take the form of an aperture or socket, for example formed in the support post 6 as illustrated.

The tenon 152, which may for example comprise a latch 156, is movable, typically pivotably, into and out of engagement with any one of the mortises 150 with which it is aligned depending on the relative position of the upper and base structures 2, 25. In this example, the tenon 152 is pivotably coupled to the upper structure 25, e.g. to the frame 4.

In preferred embodiments, the locking devices 48, 170 are coupled to the common operating mechanism 58 (as too may be the actuator 138 if it is a lockable actuator). The operating mechanism 58 is operable by a user to operate the locking devices 48, 170 (and actuator 138 if applicable) between their locked and unlocked states. In the preferred embodiment the operating mechanism 58 operates the locking devices simultaneously. The operating mechanism 58 comprises a user operable control 59, for example a button or switch, and a respective linkage 60, 61, 63 preferably a mechanical linkage, for example one or more cables, coupled to said locking devices for the operation thereof. Alternatively the linkage may comprise an electrical linkage, for example wired or wireless link, for controlling one or more motors to activate the locking devices. Typically, at least part of or all of the operating mechanism 58 is located in the upper structure 25. In the illustrated embodiment, the operating mechanism 58 is coupled to the respective moveable tenons 52, 152 by cables 60, 63 and causes movement of the tenons, 52 152 into out and out of locking engagement with the relevant mortise 50, 150.

The operation of the armrest assembly 101 is the same as described for the assembly 1 except for the operation of the two locking devices 48, 170 rather than one. The spaced apart mechanical-engagement locking devices 48, 170 enables the armrest assembly 101 to be load-bearing in any position of the upper structure 25 irrespective of where the load is exerted on the armrest (front or rear or anywhere in between). As such it is safe to stand on the armrest during cleaning, maintenance or installation, or in the event of an emergency.

In alternative embodiments (not illustrated), the actuator 38, 138 may be replaced by one or more power-operated actuators, especially linear actuators, for example, electrically, hydraulically or pneumatically powered actuators. The or each powered actuator may be operable by the operating mechanism 58 and control 59 via any suitable link, e.g. electrical or hydraulic connection.

The invention is not limited to the embodiment(s) described herein but can be amended or modified without departing from the scope of the present invention.

The invention claimed is:

1. An armrest assembly comprising:
   a base structure;
   an upper structure that has an upper surface providing an armrest, the upper structure being movable with respect to the base structure between a plurality of adoptable positions comprising at least an upper position and a lower position;
   an extendible actuator that is operable between an extended state and a retracted state to control movement of said upper structure relative to said base structure; and
   a first locking device operable to lock said upper structure with respect to said base structure in at least one of said plurality of adoptable positions, said first locking device including locking elements that inter-engage mechanically when said first locking device locks said upper structure with respect to said base structure;

wherein said upper structure is a panel structure, and wherein at least part of said actuator is located inside said upper panel structure, wherein said base structure is a panel structure, and wherein, at least part of said actuator is located inside said base structure;

wherein said base structure and said upper structure are assembled together telescopically, and wherein said upper structure is the outer telescopic component of the telescopic assembly;

wherein said actuator is operable between a locked state in which said actuator is locked to prevent movement of said upper structure with respect to said base structure, and an unlocked state in which said actuator is unlocked to facilitate movement of said upper structure with respect to said base structure; and wherein said armrest assembly includes at least one operating mechanism coupled to said actuator and being operable by a user to operate said actuator between its locked and unlocked states, said at least one operating mechanism being coupled to said locking device and being operable by said user to operate the locking device.

2. The assembly of claim 1, wherein said actuator includes biasing assembly for biasing said upper structure towards one or other of said upper or lower positions, and wherein said biasing assembly may comprise resilient biasing assembly.

3. The assembly of claim 2, wherein said biasing assembly is configured to urge said upper structure towards said upper position.

4. The assembly of claim 2, wherein said biasing assembly is configured to urge said actuator into an extended state, said actuator being operable towards a retracted state against said bias.

5. The assembly of claim 1 comprising a second locking device spaced apart from said first locking device in a direction perpendicular to the direction of movement of the upper structure, and wherein a respective one of said first and second locking devices is located on either side of the in-use central vertical axis of the armrest assembly.

6. The assembly of claim 5, wherein a respective one of said first and second locking devices is located at each end of the armrest assembly corresponding to the front and rear of the armrest assembly.

7. The assembly of claim 5, wherein the actuator is located between the first and second locking devices.

8. The assembly of claim 1, wherein the first locking device is operable to lock said upper structure with respect to said base structure in any one of a plurality of said adoptable positions.

9. The assembly of claim 1, wherein the first locking device comprises a mortise and tenon locking device, and wherein said locking elements comprise a tenon that is releasably engagable with at least one mortise.

10. The assembly of claim 9, wherein said tenon is releasably engagable with any one of a plurality of mortises, and wherein a respective mortise is provided for each of said adoptable positions.

11. The assembly of claim 1, wherein said upper structure is movable substantially linearly with respect to said base structure between said upper and lower positions in a direction that is substantially perpendicular with said upper surface.

12. The assembly of claim 1, wherein said actuator is oriented for operation towards its retracted state by movement of said upper structure in a direction away from its upper position.

13. The assembly of claim 5, wherein at least one of said first and second locking devices is operable between a locked state in which said locking elements inter-engage to prevent movement of said upper structure with respect to said base structure, and an unlocked state in which said locking elements allow movement of said upper structure with respect to said base structure.

14. The assembly of claim 1, wherein said at least one operating mechanism is operable by a user to operate simultaneously said first locking device and said actuator between respective locked and unlocked states.

15. The assembly of claim 1, wherein said locking elements include a movable tenon, said operating mechanism being coupled to said tenon for movement of said tenon into and out of locking engagement with a mortise.

16. The assembly of claim 5, wherein at least one of said first and second locking devices is located inside said upper panel structure.

17. The assembly of claim 5, wherein at least one of said first and second locking devices is located inside said base panel structure.

18. A seating installation comprising at least one seat and an armrest assembly as claimed in claim 1.

19. The assembly of claim 1, wherein said actuator is a linear actuator.

20. The assembly of claim 1, wherein said actuator is a fluid-operated actuator.

* * * * *